United States Patent Office 2,845,367
Patented July 29, 1958

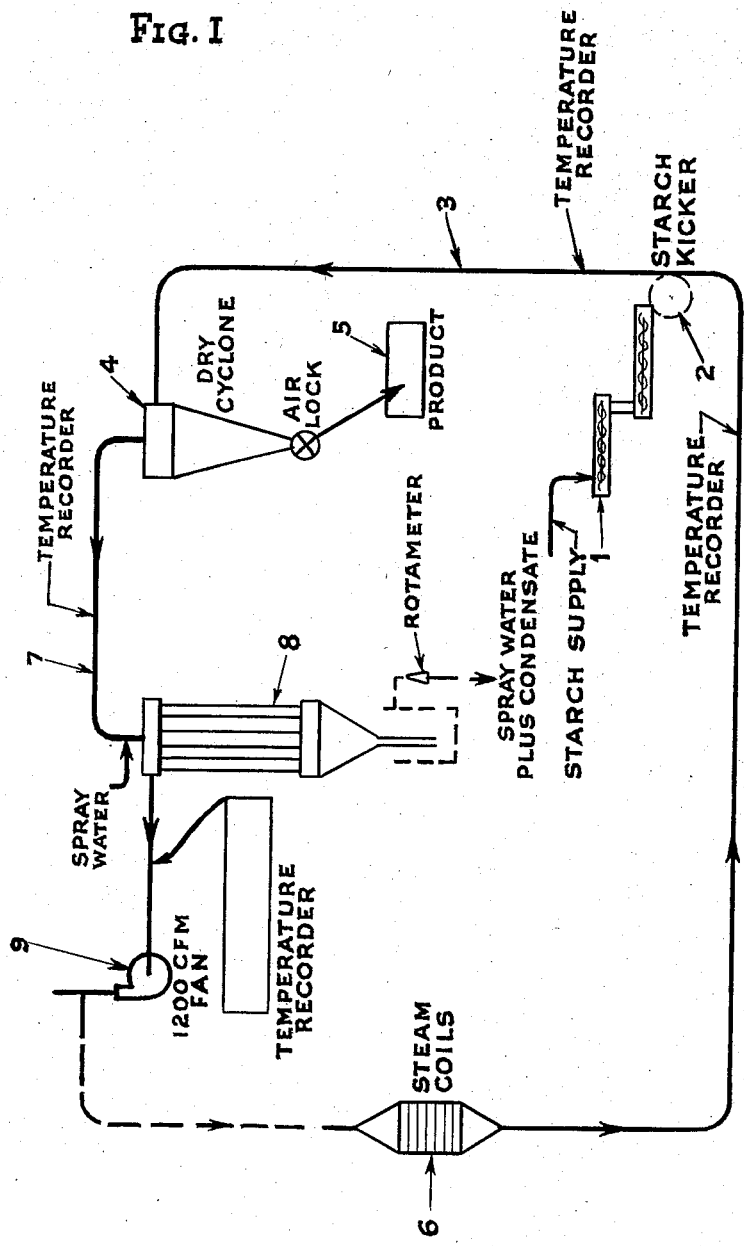
Fig. I

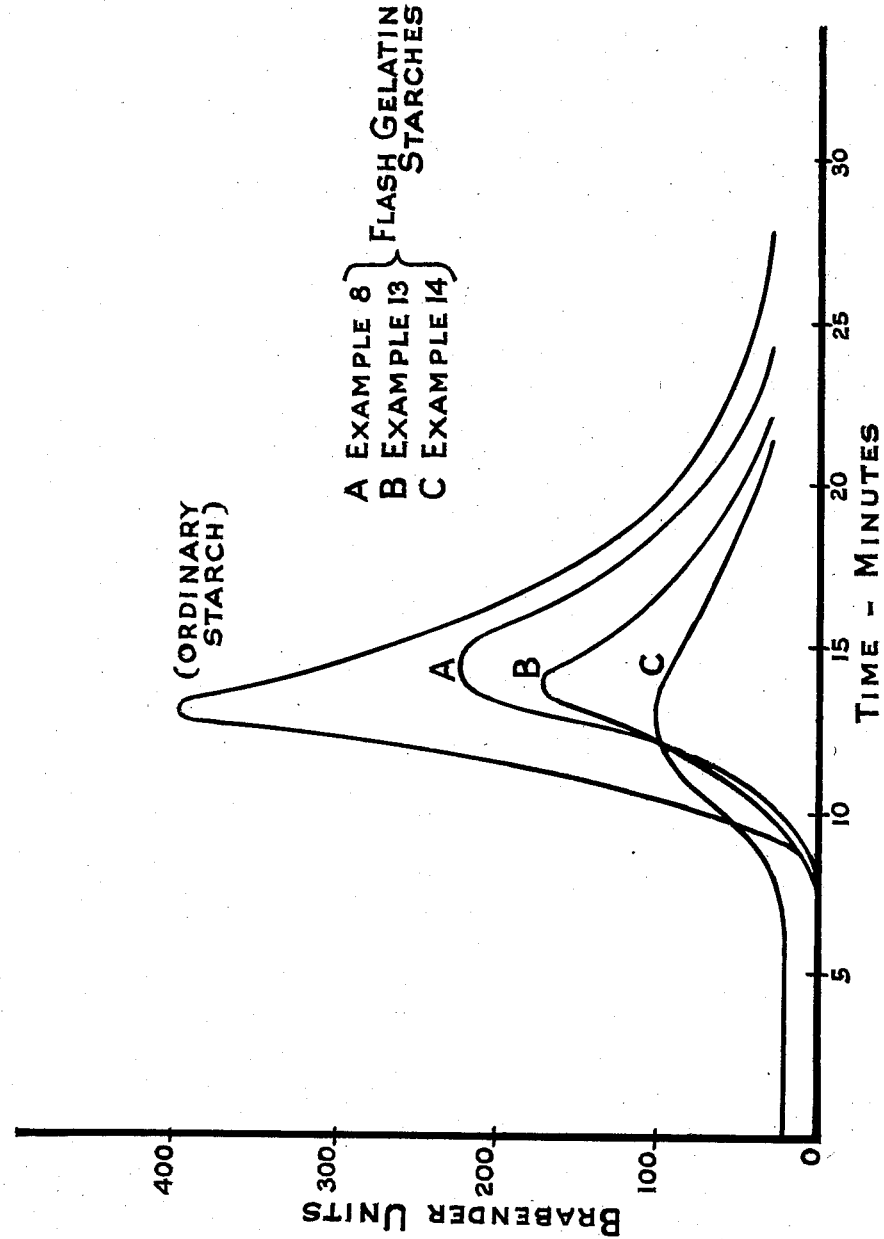

2,845,367
PREPARATION OF DUSTLESS STARCH

Edward E. Alt, Jr., Hillsdale, N. J., and Robert J. Davis, Guadalajara, Jalisco, Mexico, assignors to Corn Products Refining Company, New York, N. Y., a corporation of New Jersey Application August 1, 1956, Serial No. 601,530

2 Claims. (Cl. 127—32)

This invention relates to a new and novel process for gelatinizing and drying starch in a single operation. Our invention has particular application in making dustless, partially or substantially completely gelatinized starch aggregates which are readily suspendable in cold water.

The brewing industry has long desired a so-called dustless starch. So-called starch dust is objectionable in a brewery not only from a housekeeping standpoint but also because of contamination of the finished beer. Further, considerable savings to the brewer would result from the use of a starch which has been pregelatinized inasmuch as this would eliminate the cooking step necessary before the organisms can cause its conversion. However, pregelatinized products heretofore available are too costly.

Starch which has been pregelatinized and is readily redispersible in water would be particularly useful in the paper industry as a beater size. Paper makers prefer to add a starch product to the beater which requires no cooking. Such products would also be useful in clay coating inasmuch as they can be converted with enzymes without passing through the high peak viscosity of ordinary raw starch.

Processes now known and used for simultaneously drying and gelatinizing starch, e. g., by spray or hot roll drying aqueous slurries or pastes of starch result in products which are either a dusty impalpable powder or become so on handling. These products in addition to being dusty, are difficultly or slowly suspendable in cold water.

It has also been proposed to prepare starch agglomerates by using gelatinized starch as a binder (U. S. 2,178,235) but these agglomerates contain only an insignificant amount of gelatinized starch. Further, it has been proposed to subject starch to the action of steam to swell or gelatinize the granules (U. S. 2,216,179; British 474,320; British 468,830; German 710,901; U. S. 1,133,914; U. S. 2,177,138). U. S. 1,899,952 proposes heating starch in an atmosphere saturated with water vapor at temperatures high enough to gelatinize the starch and then passing the gelatinized starch through heated rolls. Due to the mode of drying, these products generally contain horny lumps which are difficult to suspend in water.

The main object of this invention is to provide a method for gelatinizing and drying starch in one operation. Another object is to prepare a dustless starch which is gelatinized to various degrees and which is readily suspendable in cold water. Other objects will appear hereinafter.

We have discovered that starch may be gelatinized and dried in one operation by using drying equipment which operates on the principle of flash drying and using therein air which has controlled temperatures and moisture contents. By controlling the amount of moisture and temperature of the air, and incidentally of the starch, during the treatment of the starch in the drier and providing an escape for the moisture removed from the starch, it is possible to gelatinize and dry the starch in the same operation.

The amount of moisture in the starch entering the drier may be any amount as long as it is sufficient to gelatinize the starch, i. e., at least about 25 percent, but the practical operating range is about 32 to 45 percent. Generally starch filter cake (containing 35–45 percent moisture) obtained by the usual mechanical dewatering operations is suitable. If the moisture content of the starch exceeds 45 percent, there will be difficulty in handling the starch and chances are that the feeding mechanism to the drier will become clogged. Generally it is not possible to mechanically dewater a starch slurry (e. g., of corn starch) to a moisture content below 30 to 32 percent and although starch containing less moisture than this amount will gelatinize, there is no practical advantage in using such starch in the invention.

The temperature of and amount of moisture in the inlet drying air may vary considerably but they are critical and should be within the following ranges:

Wet bulb temperature of about 170° F. to and including superheated steam.

Dry bulb temperature may vary from a minimum of the wet bulb temperature to a maximum at which the starch decomposes. A practical operating range is 350 to 550° F.

The degree of gelatinization of the starch will depend upon the amount of moisture in the starch to be treated, wet bulb temperature of the drying medium, dry bulb temperature of the drying medium, rate at which starch is fed to the drier, and time of contact. In general the amount of gelatinization increases with an increase in each variable and the maximum amount of gelatinization occurs when all variables are at a maximum.

The finished product contains a certain proportion of gelatinized granules depending upon conditions used and has a bulk density less than raw starch. It is in powdered form but is substantially dustless and feels somewhat gritty to the touch. The moisture content of the final product may be adjusted to any desired commercial level by selection of the proper drying conditions.

The drying equipment which has been used satisfactorily in carrying out the invention consists of a flash drier which includes a high efficiency dry cyclone, a wet cyclone, means for recirculating the humid air through a heat exchanger and means for controlling the wet and dry bulb temperatures of the air.

The invention will appear more clearly from the following detailed description when taken in connection with Fig. I, showing a preferred embodiment of the inventive idea, and the examples. The examples are intended to be illustrative only and not in any sense limiting the invention.

Referring now to Fig. I, moist starch, e. g., starch cake from a mechanical dewatering operation is introduced into 1, a feed conveyor, from which it is introduced into 2, a feeding device, such as a pin mill machine, which finely divides the starch and forces it into 3, a duct to give hold-up time to the starch and air. After being gelatinized and dried in the duct, the product is collected in 4, a dry cyclone, and packed out at 5, a packing device. Air passes through exit air line 7 to a wet cyclone 8 to adjust the moisture content thereof. Spray water is introduced into 8 to cool the air to saturation and remove the water unless superheated steam is the drying medium in which case a portion of the vapor is bled off to the atmosphere. After leaving 8, the air passes through 9, an air recirculating fan, and then into air heater 6 to bring the temperature to the desired level. The dotted line 9 to 6 in Fig. I shows that after the air leaves 9, a cycle has been completed and a new one, as concerns the air, starts at 6. In starting the air cycle, the air from 6 may be moistened by introducing steam into the line entering the duct, 3.

In Table I below are tabulated the conditions under which 14 different experiments were conducted in accordance with the process above described, and the results obtained. Corn starch obtained by dewatering starch slurries with a vacuum filter or a centrifuge was used. It will be noted from the table that wide ranges of conditions may be used to produce a variety of products.

The principles of our invention are applicable to all varieties of starches and low soluble dextrins, modified starches, e. g., thin boiling starches, starch derivatives, e. g., starch ethers and esters in the unswollen granule state. It is obvious that there may be included during the operation various chemical adjuncts which modify the eventual paste properties of the starch undergoing treatment, e. g., acids; acid salts, such as $$AlCl_3.6H_2O, CaCl_2$$

and the like.

The advantages of products of our invention in enzyme conversions are illustrated in Fig. II. 75 g. (D. B.) of samples of raw starch and starch treated in accordance with Examples 8, 13 and 14 were suspended in 450 g. of water. To each suspension was added 0.3 g. of alpha-amylase sold under the trademark Amyliq Concentrate and sufficient $CaCO_3$ to adjust the pH of the suspension to 7.1 to 7.2. The suspensions were heated to 170° F. and maintained at this temperature for the times indicated in Fig. II. Viscosities were measured in a Brabender viscometer and these were plotted against the time. It will be readily apparent that the peak viscosities of the starches treated in accordance with our invention (curves A, B, and C) are considerably less than for raw starch. This property is particularly useful in clay coating of paper or in the textile industry where the starch is converted with enzymes.

Cold-water suspensions of granular starches (in the unswollen state) are not significantly attacked by enzymes and are therefore cooked prior to use in clay coating. High peak viscosities limit the solids content of the coating. However, the products of our invention are partially or substantially completely gelatinized and therefore are subject to enzyme action. Thus, if our product is suspended in cold water, a liquefying enzyme added, and the slurry heated, the starch will be converted continuously and smoothly, without passing through the very high peak viscosity which is usual with ordinary granular starches. It is also possible to convert at lower temperatures, in fact it is possible to heat the dispersion directly to the enzyme inactivation point without the customary holding period for conversion at about 170° F. Also, the much lower peak viscosity of the mixture permits the use of higher solids coatings and/or the use of lower power and less expensive mixing equipment. The products of the present invention are particularly suitable where the starch is enzymatically converted in the presence of clay and various coating pigments, since the avoidance of a high peak viscosity is especially important in this mode of processing.

Table I

| Example No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Percent Moisture in Starch to Feeder (1) | 32.4 | 32.4 | 32.6 | 32.4 | 32.3 | 32.4 | 36.6 | 36.1 | 35.6 | 36.1 | 45.1 | 44.9 | 41.2 | 35.1 |
| Dry Bulb Air Temp. Leaving Heater (6), °F. | 345 | 345 | 345 | 345 | 345 | 345 | 348 | 348 | 348 | 348 | 342 | 342 | 345 | 348 |
| Dry Bulb Air Temp. Into Feeder (1), °F. | 340 | 335 | 340 | 335 | 335 | 335 | 345 | 343 | 338 | 330 | 341 | 318 | 342 | 328 |
| Dry Bulb Air Temp. Into Dry Cyclone (4), °F. | 245 | 245 | 250 | 255 | 265 | 268 | 245 | 256 | 250 | 253 | 244 | 237 | 252 | 245 |
| Dry Bulb Air Temp. Leaving Dry Cyclone (4), °F. | 215 | 218 | 220 | 224 | 230 | 235 | 213 | 219 | 216 | 229 | 215 | 223 | 220 | 230 |
| Dry Bulb Air Temp. Leaving Wet Cyclone (8), °F. | 175 | 188 | 190 | 218 | 224 | 232 | 210 | 217 | 218 | 225 | ----- | ----- | 215 | 226 |
| Wet Bulb Air Temp. Leaving Dry Cyclone (4), °F. | 176 | 185 | 190 | 205 | 200 | 210 | 180 | 192 | 199 | 206 | 174 | 194 | 185 | 208 |
| Product Rate, lbs./hr. | 258 | 261 | 270 | 259 | 252 | 253 | 258 | 252 | 321 | 320 | 149 | 201 | 204 | 280 |
| Steam Pressure, p. s. i. | ----- | ----- | 140 | ----- | ----- | ----- | 140 | ----- | ----- | ----- | 136 | 136 | 142 | 140 |
| Steam Rate, lbs./hr. | 220 | 220 | 220 | 160 | 195 | 190 | 225 | 205 | 205 | 195 | 270 | 225 | 210 | 190 |
| Percent Moisture in Finished Product | 7.2 | 7.4 | 8.2 | 12.9 | 9.1 | 15.4 | 7.9 | 9.3 | 13.4 | 16.4 | 8.1 | 19.7 | 13.2 | 13.2 |
| Bulk Density of Finished Product, lbs./cu. ft. | 39.9 | 37.9 | 37.0 | 29.6 | 33.9 | 30.3 | 38.6 | 35.6 | 30.4 | 28.0 | 38.7 | 33.5 | 33.8 | 26.5 |
| Percent Gelatinization in Finished Product* | ----- | <10 | 10 | 50 | 30 | 10-20 | ----- | 10-20 | 10-20 | 50 | ----- | 60-70 | 30-40 | 60-70 |

*This is determined by an optical count of the starch particles having partial or complete loss of birefringence divided by the total number of particles, expressed as percent. (Anal. Chem. 28, 382 (1956).)

We claim:
1. A process for gelatinizing and drying moist starch in one operation which comprises subjecting moist starch containing about 25 to about 45 percent of moisture and in finely divided form to treating in a flash drier wherein the inlet drying air has a wet bulb temperature within the range of about 170° F. to and including superheated steam and a dry bulb temperature within the range of the wet bulb temperature to that at which the starch decomposes and separating the moist air from the resultant gelatinized and dried starch and removing such starch from the system and treating said moist air to adjust it to the aforementioned wet and dry bulb temperatures and returning it to said flash drier along with additional moist starch to be dried.

2. Process according to claim 1 wherein the wet bulb range is 170 to 212° F. and the dry bulb range is 350 to 550° F.

References Cited in the file of this patent
UNITED STATES PATENTS

| | | |
|---|---|---|
| 1,035,831 | Anderson | Aug. 20, 1912 |
| 1,133,914 | Bergh et al. | Mar. 30, 1915 |
| 2,148,016 | Gale | Feb. 21, 1939 |
| 2,177,378 | Schorn et al. | Oct. 24, 1939 |
| 2,235,683 | Horesi | Mar. 18, 1941 |
| 2,350,162 | Gorden | May 30, 1944 |
| 2,406,395 | Noel | Aug. 27, 1946 |
| 2,427,328 | Schopmeyer et al. | Sept. 9, 1947 |